(12) United States Patent
Jacobsen et al.

(10) Patent No.: US 7,990,412 B2
(45) Date of Patent: Aug. 2, 2011

(54) SYSTEMS AND METHODS FOR CORRECTING IMAGE PERSPECTIVE

(75) Inventors: Dana Jacobsen, Boise, ID (US); Samuel Lester, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1874 days.

(21) Appl. No.: 10/978,326

(22) Filed: Nov. 1, 2004

(65) Prior Publication Data
US 2006/0093237 A1   May 4, 2006

(51) Int. Cl.
*H04N 15/00* (2006.01)
*G06K 9/40* (2006.01)

(52) U.S. Cl. .......................... 348/44; 382/275
(58) Field of Classification Search ............ 348/207.1, 348/207.11, 211.6, 333.01; 382/275
See application file for complete search history.

(56) References Cited

U.S. PATENT DOCUMENTS

| | | | |
|---|---|---|---|
| 4,081,812 A | 3/1978 | Flother | |
| 5,534,959 A | 7/1996 | Keelan et al. | |
| 6,249,285 B1 * | 6/2001 | Madden et al. | 345/419 |
| 6,256,452 B1 * | 7/2001 | Yamamoto | 386/225 |
| 6,346,967 B1 | 2/2002 | Gullichsen et al. | |
| 6,449,004 B1 * | 9/2002 | Okisu et al. | 348/44 |
| 6,501,474 B1 * | 12/2002 | Thomson et al. | 345/441 |
| 6,618,511 B1 | 9/2003 | Mancuso et al. | |
| 6,963,365 B2 | 11/2005 | Baron | |
| 7,035,462 B2 * | 4/2006 | White et al. | 382/167 |
| 7,295,699 B2 * | 11/2007 | Ohba et al. | 382/154 |
| 2001/0046036 A1 * | 11/2001 | Honma | 355/18 |
| 2002/0141636 A1 * | 10/2002 | Wakamoto et al. | 382/154 |
| 2004/0041920 A1 * | 3/2004 | Mizukami et al. | 348/222.1 |
| 2004/0186801 A1 * | 9/2004 | Morita | 705/32 |

FOREIGN PATENT DOCUMENTS

| | | |
|---|---|---|
| JP | 8163427 | 6/1996 |
| JP | 2004147138 | 5/2004 |
| JP | 2004200818 | 7/2004 |

* cited by examiner

*Primary Examiner* — Lin Ye
*Assistant Examiner* — Trung Diep

(57) ABSTRACT

Systems and methods for correcting perspective in an image are invented and disclosed. One embodiment comprises capturing image data responsive to light incident upon an image-capture device, wherein the image data includes a first perspective of a subject-of-interest, providing an image-processing algorithm executable by the image-capture device, the image-processing algorithm configured to generate modified data responsive to the image data and a perspective-correction factor, and executing the image-processing algorithm over the image data in accordance with the perspective-correction factor to generate modified data that includes a second perspective of the subject-of-interest.

34 Claims, 9 Drawing Sheets

SYSTEMS AND METHODS FOR CORRECTING IMAGE PERSPECTIVE

BACKGROUND

Image perspective error has long been recognized in the photographic arts. Traditionally, image perspective correction has been accomplished using view cameras or shift lenses. For some time now, bellows-type view cameras have been used to tailor the perspective and depth of field to the individual scene desired to be photographed. In many cases, bellows-type view cameras can provide photographs not possible with rigid cameras; that is, cameras with a fixed relationship between the lens and the image plane. As is known in the camera arts, bellows-type view cameras have the capability to raise and lower a lens plane relative to the image plane and vice-versa. In addition, the lens plane and/or the image plane can be tilted.

In operation, translating the image plane or the lens plane changes the field of view while maintaining constant depth of field. Tilting the lens plane or the image plane alters the orientation and shape of the depth of field volume, but does not affect the field of view. Lens movements do not affect perspective, but require high lens coverage to avoid image transitions near the borders of captured images. In contrast, image plane movements affect perspective, but do not require high lens coverage.

Although bellows-type view cameras control perspective and depth of field, they are cumbersome, expensive, and generally used only by professional photographers. Attempts have been made to provide some of these control features in rigid cameras. One solution is to add what are known as perspective control lenses or shift lenses. Shift lenses provide large coverage and built-in translational adjustments. However, shift lenses are expensive and have inferior features relative to conventional lenses. For example, shift lenses have fixed focal lengths and manual aperture adjustments. Another solution has been to provide lenses for rigid cameras with both translation and tilt capabilities. However, these lenses are extremely expensive and the tilt feature is in one direction only.

Still other solutions include repositioning the camera with respect to the subject-of-interest. One solution would be to position the camera such that the camera is half as high as the height of the subject-of-interest. This solution still requires that the camera be positioned a specific distance from the subject-of-interest to achieve correct perspective. A second repositioning solution requires a clear distance between a level camera and the subject-of-interest to achieve correct perspective in an image. This solution is not always possible and creates an image where the subject-of-interest fills only a portion of the available image plane. For example, it is often impossible to find a location with a clear view of a tall building where a level camera can capture the entire building.

Digital image-capture devices are configured to capture images that are stored in a memory device or on a suitable storage medium as digital information. The orientation of the captured image initially corresponds to the orientation of the image sensor, such as a charge-coupled device (CCD) or the like, because the image sensor is physically fixed in position within the digital image-capture device. When the digital image-capture device is held by the user in an "upright" position, such that the top portion of the CCD corresponds to the top portion of the image to be captured, the captured image, when viewed on a display, will be properly oriented on the display. That is, the top of the captured image will be displayed at the top of the display. However, the user of the digital image-capture device may on occasion choose to capture the image when the digital-image capture device is oriented in a "non-upright" position. It is often the case that the user of the digital image-capture device will not arrange the image sensor such that it is substantially parallel with a longitudinal axis of relatively tall subjects-of-interest.

Some digital image-capture devices have systems for recording orientation information associated with the capture of still images, for example U.S. Pat. No. 6,563,535, Image Processing System For High Performance Digital Imaging Devices; U.S. Pat. No. 5,764,535, Image Authentication Patterning; U.S. Pat. No. 6,532,039, System and Method For Digital Image Stamping; U.S. Pat. No. 6,275,269, Positioning Stamps In Images Captured With An Image Capture Unit; U.S. Pat. No. 6,011,585, Apparatus And Method For Rotating The Display Orientation Of A Captured Image; and U.S. Pat. No. 6,476,863, Image Transformation Means Including User Interface. While orientation sensors could provide the necessary information to correct perspective errors, it is not always cost effective or desirable to add orientation sensors to digital image-capture devices.

Therefore, it is desirable to introduce low-cost systems and methods for perspective correction in captured images without need for orientation sensors, additional lenses, and lens adjustments.

SUMMARY

One embodiment of an apparatus comprises an image-capture system configured to acquire image data representing a subject-of-interest, an input control, and an image processor coupled to the image-capture system. The image processor is configured to execute an image-processing algorithm on the image data to generate modified data responsive to the input control and a perspective-correction factor.

Another embodiment of an apparatus comprises an image-capture system configured to capture image data representing a subject-of-interest, an input control, and an image processor. The image processor is configured to determine a perspective-correction factor that when applied in an image-processing algorithm on the image data generates modified data responsive to the input control and the perspective-correction factor.

BRIEF DESCRIPTION OF THE DRAWINGS

The present systems and methods for correcting image perspective, as defined in the claims, can be better understood with reference to the following drawings. The components within the drawings are not necessarily to scale relative to each other, emphasis instead is placed upon clearly illustrating the principles of the systems and methods for correcting image perspective.

DETAILED DESCRIPTION

Figure 1:
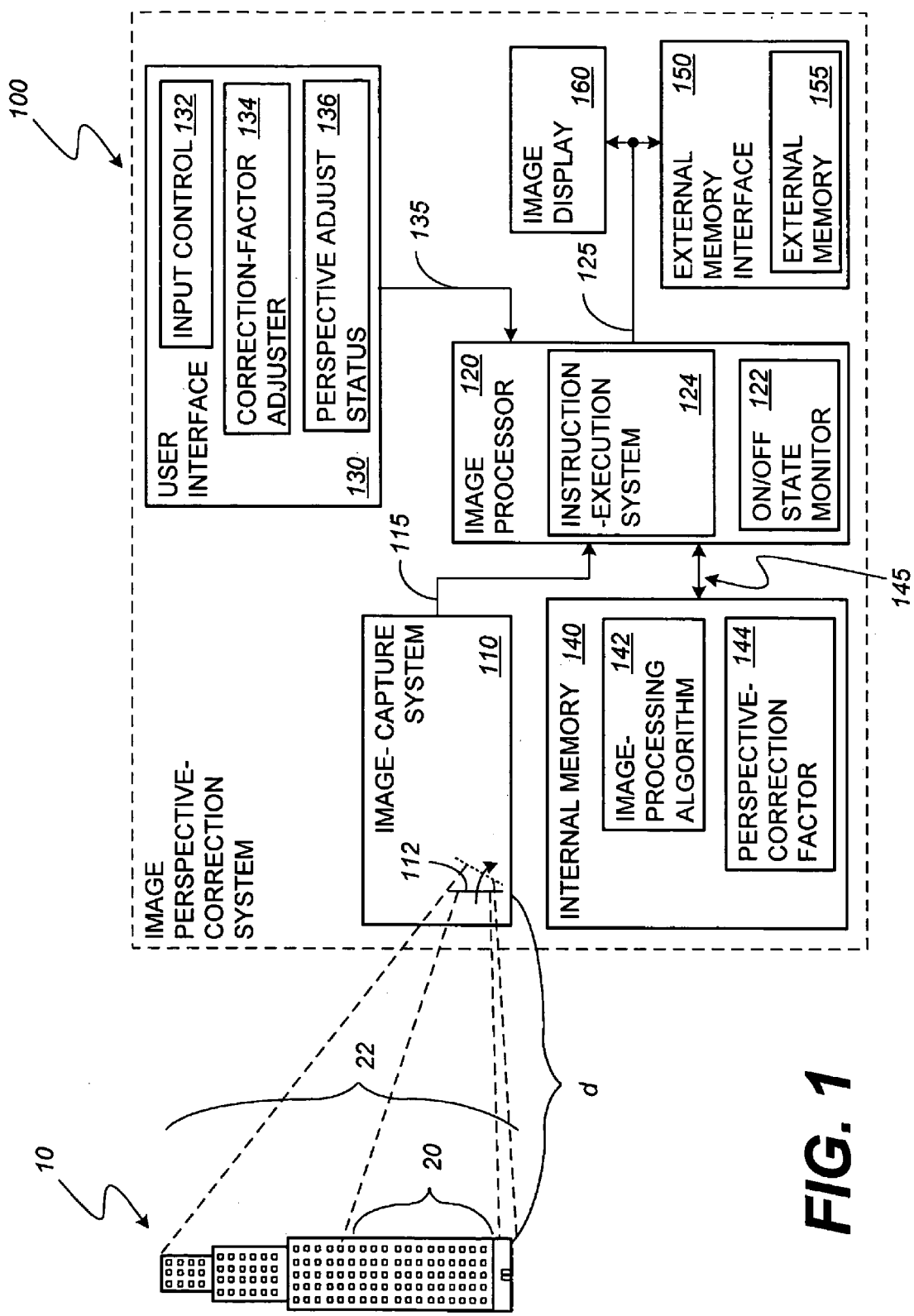
FIG. 1 is a combination schematic and functional block diagram illustrating a subject-of-interest and an embodiment of an image perspective-correction system.

Turning to the drawings that illustrate various embodiments of systems and methods for modifying image perspective, FIG. 1 is a combination schematic and functional block diagram illustrating a subject-of-interest 10 and a image perspective-correction system 100. For convenience, the image perspective-correction system 100 is illustrated as a generic combination of an image-capture system 110 along with various post capture image-processing components. Embodiments of the present systems for modifying image perspective may be implemented in any device configured to capture images, such as, but not limited to, a video camera configured to capture either still images or video clips, a digital camera, or other similar devices. It is understood that embodiments of the present systems for modifying image perspective can apply equally to other types of image-capture devices, such as suitably configured cellular telephones, personal-digital assistants (PDAs), portable computers, etc.

As illustrated in FIG. 1, subject-of interest 10 is a multiple-story building. The subject-of-interest 10 is taller than the field of view 20 provided at distance, d, between the building and image plane 112 of the image-capture system 110. The field of view 20 at distance, d, from the image plane 112 is depicted with the dashed lines connecting image-perspective system 100 to subject-of-interest 10. As is known, image plane 112 can be rotated upward, that is, rotated clockwise in the illustrated arrangement, to place the entire height of the subject-of-interest 10 within a modified field of view 22 when the subject-of-interest 10 and the image perspective-correction system 100 are separated by d.

In addition to image-capture system 110, the image perspective-correction system 100 includes image processor 120, user interface 130, internal memory 140, external-memory interface 150, and image display 160. Image processor 120 is configured to receive image data from image-capture system 110, internal memory 140, or external-memory interface 150. Image processor 120 receives image data via connection 115 when image data is provided by image-capture system 110. Image processor 120 receives image data via connection 125 when image data is retrieved from external-memory interface 150. Image processor 120 receives image data via connection 145 when image data is retrieved from internal memory 140. Image data transfer operations from internal memory 140, external-memory interface 150, or image capture system 110 are operator controllable from one or more controls (not shown) associated with user interface 130.

User interface 130 includes an input control 132, which provides an on/off status signal via connection 135 to image processor 120. When input control 132 provides a signal indicative of an "on" status, on/off state monitor 122 activates instruction-execution system 124 to load or otherwise access image-processing algorithm 142 and perspective-correction factor 144. Thereafter, instruction-execution system 124 processes image data in accordance with the algorithm and perspective-correction factor 144. Image processor 120 executes images-processing algorithm 142 over the image data in accordance with perspective-correction factor 144 to generate modified data having an image perspective that is different from the image perspective present in the original (i.e., captured) image data. Image-processing algorithm 142 can be any known or future developed algorithm which modifies perspective in an image by manipulating the data underlying a plurality of the picture elements or pixels used to produce a representation of an image.

When input control 132 provides a signal indicative of an "off" status, image processor 120 bypasses image-processing algorithm 142. Whether image-processing algorithm-142 is activated or bypassed, newly captured image data is controllably forwarded to one or both memory devices. When captured image data is directed for storage in internal memory 140, image data is forwarded via connection 145. When captured image data is directed for storage and/or transfer to external devices (not shown), captured image data is forwarded via connection 125 to external-memory interface 150. Captured image data can be controllably stored to external memory 155. External memory 155 is any media that can store image data. Captured image data can also be controllably directed to image display 160. In addition, image data transfer operations from external-memory interface 150 to display 160 are also operator controllable from one or more controls (not shown) associated with image perspective-correction system 100.

Correction-factor adjuster 134 provides a mechanism for an operator of the image perspective-correction system 100 to modify the magnitude of perspective-correction factor 144 within internal memory 140. When correction-factor adjuster 134 provides a control signal indicative that increased perspective adjustment is desired, connection 135 provides the control signal, which directs the image processor 120 to increase the magnitude of the image perspective-correction factor 144 via connection 145. Conversely, when correction-factor adjuster 134 provides a control signal indicative that decreased perspective adjustment is desired, connection 135 provides the control signal to image processor 120, which directs the decrease of the magnitude of the image perspective-correction factor 144 via connection 145. While correction-factor adjuster 134 is shown in FIG. 1 integrated within user interface 130, in alternative embodiments the correction-factor adjuster 134 can be implemented within an appropriately configured processor coupled to user interface 130.

User interface 130 further includes perspective adjust status output 136. The perspective adjust status output 136 is activated when input control 132 provides a signal indicative of an "on" status and provides information to an operator of the image perspective-correction system 100 regarding the perspective-correction factor 144 presently applied to the image data. The perspective adjust status output 136 can include one or more indicators responsive to the relative position of the perspective-correction factor 144 over the controllable range of the correction-factor adjuster 134.

Image processor 120 adjusts the perspective within the captured image in accordance with the perspective correction factor 144. Image processor 120 forwards the adjusted image data to image display 160 or to external-memory interface 150 for review. An operator of the image perspective-correction system 100 can further adjust correction factor 144 as may be desired. An adjusted image, as provided by image processor 120, is forwarded to display 160 or external-memory interface 150 as a result of each user adjustment to correction factor 144. Input control 132 can be configured to enable the operator to confirm when the image perspective in a reviewed image is as desired. Optionally, the image perspective-correction system 100 can be configured to save the last adjusted image.

Image perspective-correction system 100 can be implemented using combinations of hardware, software, or firmware. The image perspective-correction system 100 can be implemented using a combination of hardware and software that is stored in an internal memory and that is executed by instruction execution system 124 provided within an application-specific integrated circuit (ASIC), a microprocessor, etc.

Hardware components of the systems for correcting image perspective can be implemented with any or a combination of the following technologies, which are all well known in the art: a discrete logic circuit(s) having logic gates for implementing logic functions upon data signals, an application specific integrated circuit (ASIC) having appropriate combinational logic gates (as described in the illustrated embodiment), a programmable gate array(s) (PGA), a field programmable gate array (FPGA), etc.

Software or firmware components of the systems for correcting image perspective, including variables such as perspective-correction factor 144, can be stored and later read from one or more memory elements. Software and/or firmware can be forwarded to and executed by a suitable general purpose or application specific processor. Furthermore, software or firmware for correcting image perspective, which comprises an ordered listing of executable instructions and data for implementing logical functions, can be embodied in any computer-readable medium for use by, or in connection with, an instruction-execution system, apparatus, or device, such as an appropriately configured processor-containing camera or other system that can fetch the instructions from the instruction execution system and execute the instructions.

While illustrated embodiments of the present systems and methods do not include operation with a computer, those of ordinary skill will understand that software or firmware components of the systems for correcting image perspective can be stored on and later read from a computer-readable medium. In the context of this document, a "computer-readable medium" can be any means that can contain, store the program for use by or in connection with the instruction-execution system. The computer-readable medium can be, for example, but not limited to, an electronic, magnetic, or semiconductor system, apparatus, device.

Figure 2C:
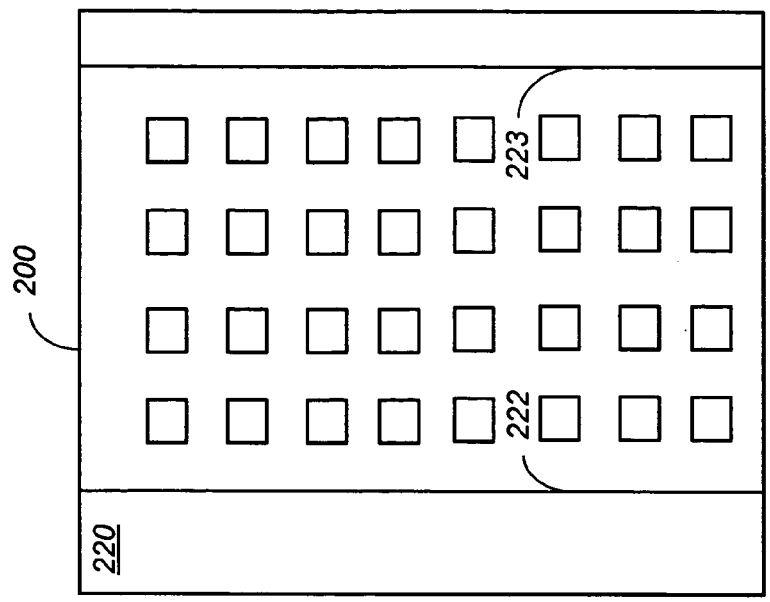
FIGS. 2A-2C are diagrams illustrating alternative views of the subject-of-interest of FIG. 1.
Figure 2B:
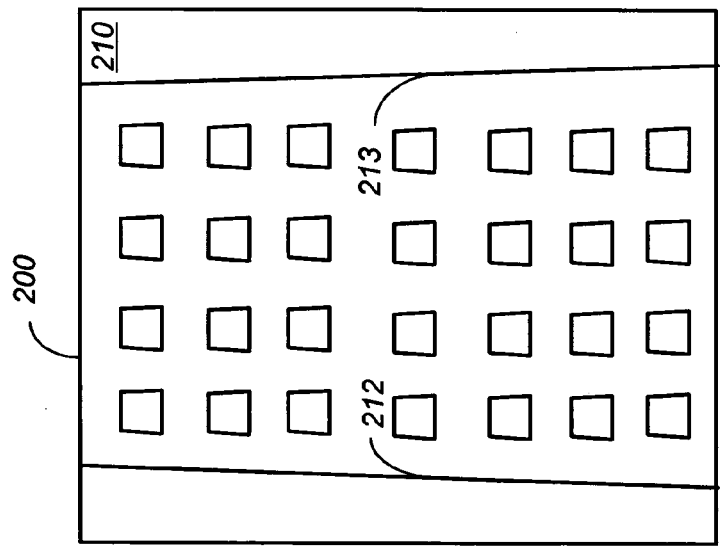
Figure 2A:
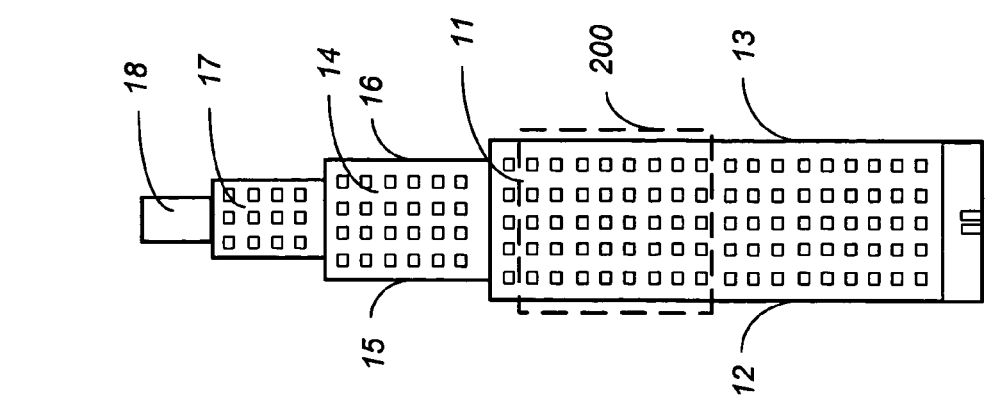

FIGS. 2A-2C are diagrams illustrating alternative views of the subject-of-interest of FIG. 1. FIG. 2A is a first diagram illustrating a front view of subject-of-interest 10. As described above, subject-of-interest 10 is a multiple-story building. As shown in FIG. 2A, subject-of-interest 10 includes a first segment 11 having a left-side wall 12 and a right-side wall 13. Left-side wall 12 and right-side wall 13 oppose each other and are substantially parallel to one another. Subject-of-interest 10 includes a second segment 14 adjacent and above first segment 11. Second segment 14 includes a left-side wall 15 and a right-side wall 16. Left-side wall 15 and right-side wall 16 oppose each other and are substantially parallel to each other. Additional segments 17, 18 are arranged above second segment 14. FIG. 2A is illustrative of a realistic perspective when observing a face of subject-of-interest 10. FIG. 2A also includes image frame 200. Image frame 200 identifies a portion of the subject-of-interest 10 that can be captured by a suitably positioned image capture device such as image perspective-correction system 100 of FIG. 1.

FIG. 2B is a second diagram illustrating a front image 210 of subject-of-interest 10 as can be expected to be captured by a digital camera or other image capture system when image plane 112 (FIG. 1) is not substantially parallel to a forward facing surface of each of the segments 11, 14, 17, and 18. Image 210 is an enlarged view corresponding to image frame 200 (FIG. 2A). As shown in FIG. 2B, image 210 is characterized by left-side wall 212 and right-side wall 213 and additional vertically arranged features (e.g., windows, doors, etc.) that begin to converge within image 210. Image 210 is illustrative of a first perspective of subject-of-interest 10 that differs from the realistic perspective presented in FIG. 2A.

FIG. 2C is a third diagram illustrating a modified front image 220 of subject-of-interest 10 in accordance with modified data generated by image processor 120 (FIG. 1) using image-processing algorithm 142 and perspective-correction factor 144. As shown in FIG. 2C, image 220 is characterized by left-side wall 222 and right-side wall 223 and other vertically arranged features (e.g., windows, doors, etc.) that appear to be parallel to one another. Image 220 is illustrative of a modified perspective of subject-of-interest 10 that more accurately depicts the realistic perspective of FIG. 2A when compared to the first perspective captured in image 210 (FIG. 2B).

While the example image data underlying image 210 includes a perspective that results in the appearance that vertically arranged features will converge, other perspective differences are possible. For example, if the image plane is not parallel with a substantially planar subject-of-interest, parallel features arranged horizontally can appear to begin to converge within the image data. By way of further example, when an image plane is not parallel to a subject-of-interest in two dimensions features arranged both horizontally and vertically will appear to converge within the image data. Accordingly, image perspective-correction system 100 (FIG. 1) is not limited to perspective correction along a single axis.

Figure 3:
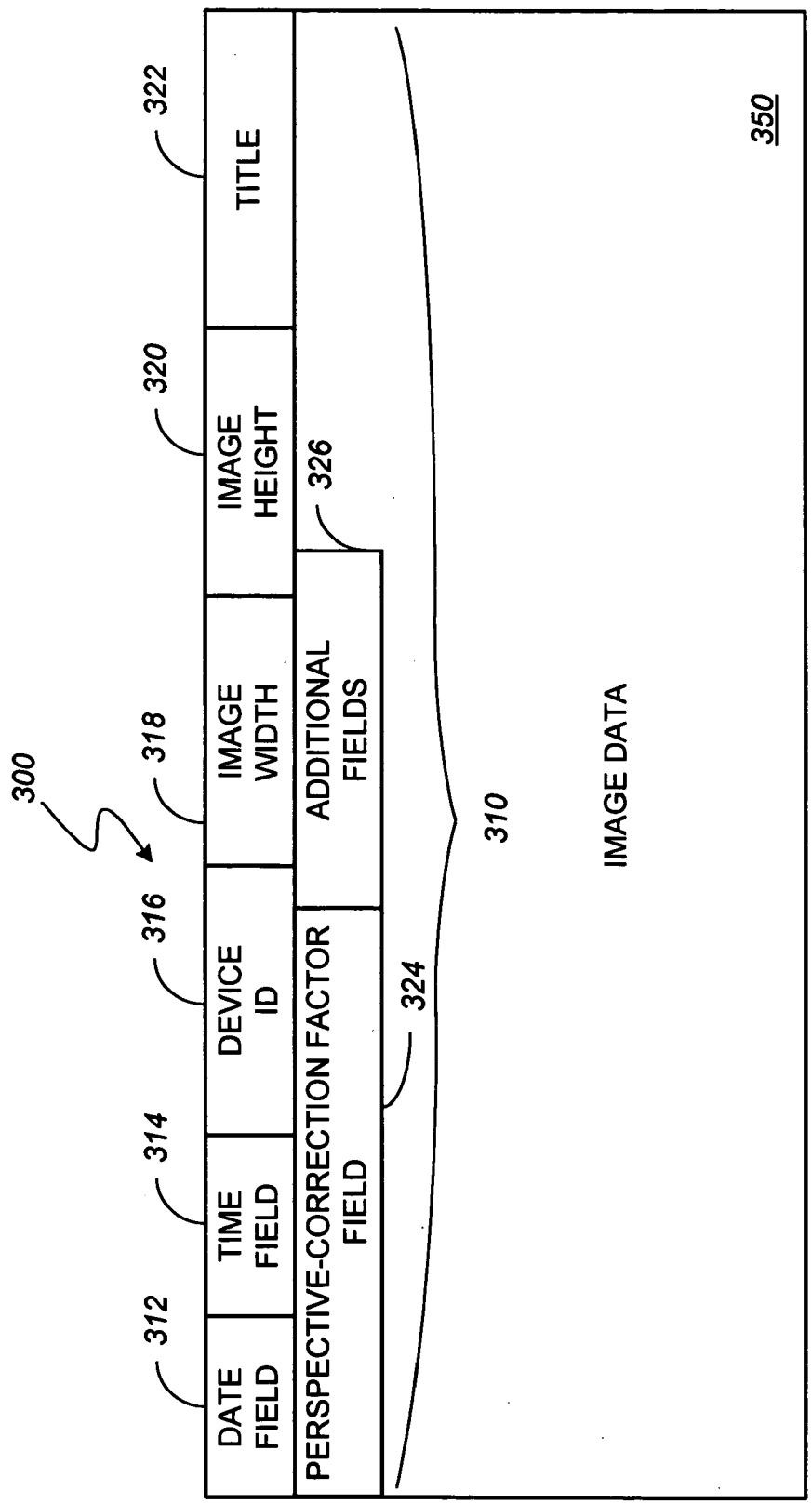
FIG. 3 is a diagram illustrating an embodiment of an image data file generated by the image perspective-correction system of FIG. 1.

FIG. 3 is a diagram illustrating an embodiment of an image data file generated by the image perspective-correction system 100 of FIG. 1. In the illustrated embodiment, image data file 300 comprises a header 310 including metadata about the underlying image and image data 350. Image data file 300 can be configured to conform to the digital camera file (DCF) format as promulgated by the Japan Electronic Industry Development Association (JEIDA) among other file formats such as joint photographic experts group (JPEG), tagged image file format (TIFF), or future file formats. In addition, image data file 300 can be configured with header 310 that includes metadata structured in accordance with the exchangeable image file format (EXIF) or other known or later developed image exchange formats. Header 310 includes data describing the circumstances associated with the capture of the image data 350. In the example illustrated in FIG. 3, the metadata includes date field 312, time field 314, device-identification field 316, image width field 318, image height field 320, title field 322, and perspective-correction factor field 324. As illustrated in FIG. 3, header 310 further includes a host of additional fields 326 each holding a representation of a respective value. In alternative embodiments (not shown), the perspective-correction factor 144 (FIG. 1) can be added or otherwise encoded within image data 350 or appended to a footer attached or otherwise associated with image data. U.S. Pat. No. 6,629,104 discloses example methods for adding metadata to an image file after an image has been captured.

Any process descriptions or blocks in the flow diagrams illustrated in FIGS. 4-9 should be understood as representing logical functions or steps in an associated process. Alternative implementations are included within the scope of the present methods for correcting or modifying image perspective. For example, functions may be executed out-of-order from that shown or discussed, including substantially concurrently or in reverse order, depending on the functionality involved.

Figure 4:
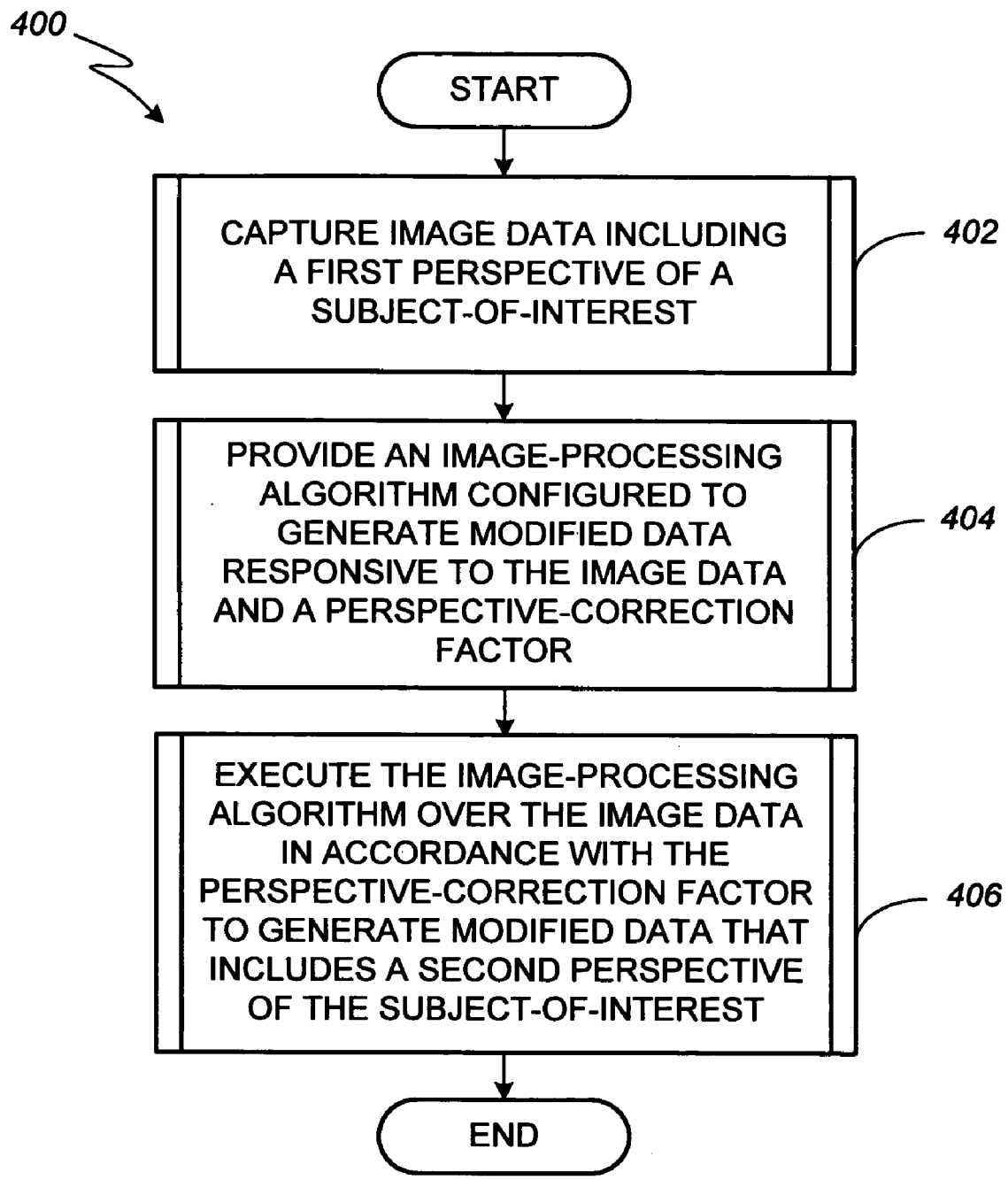
FIG. 4 is a flow diagram illustrating an embodiment of a method for modifying image perspective.

FIG. 4 is a flow diagram illustrating an embodiment of a method for modifying image perspective. Method 400 begins with block 402 where an image capture system captures image data including a first perspective of a subject-of-interest. Next, as illustrated in block 404, an image processor is provided an image-processing algorithm configured to generate modified data responsive to the image data and a perspective-correction factor. Thereafter, as indicated in block 406, the image processor executes the image processing algorithm over the image data in accordance with the perspective-correction factor to generate modified data that includes a second perspective of the subject-of-interest.

Figure 5:
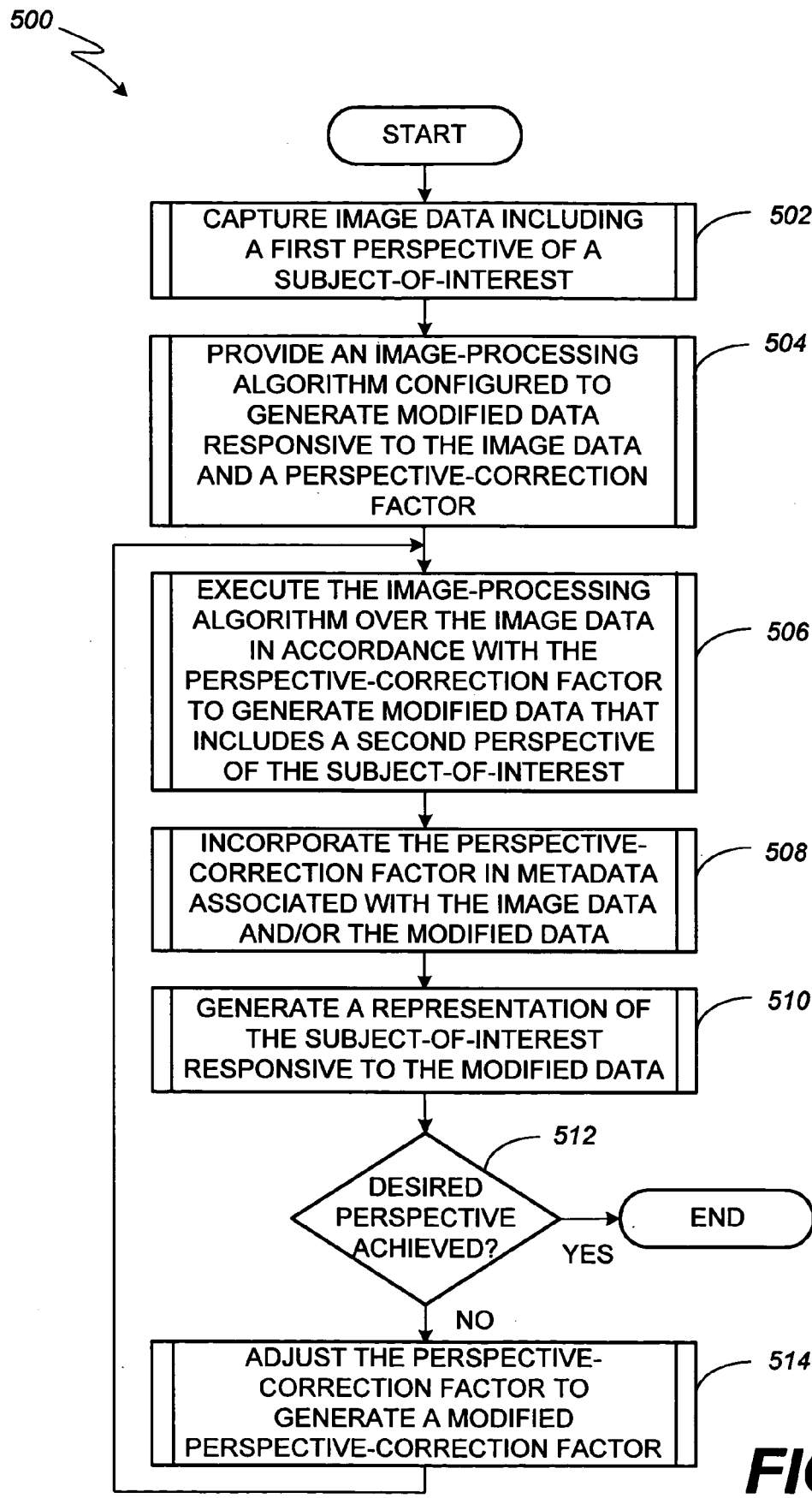
FIG. 5 is a flow diagram illustrating an alternative embodiment of a method for modifying image perspective that can be implemented on the image perspective-correction system of FIG. 1.

FIG. 5 is a flow diagram illustrating an alternative embodiment of a method 500 for modifying image perspective that can be implemented on the image perspective-correction system 100 of FIG. 1. Method 500 begins with block 502 where an image capture system captures image data including a first perspective of a subject-of-interest. Next, as illustrated in block 504, an image processor is provided an image-processing algorithm configured to generate modified data responsive to the image data and a perspective-correction factor. Thereafter, as indicated in block 506, the image processor executes the image processing algorithm over the image data in accordance with the perspective-correction factor to generate modified data that includes a second perspective of the subject-of-interest.

In block 508, the image processor and/or a data formatter incorporates the perspective-correction factor in metadata associated with the image data. Alternatively, the perspective-correction factor is incorporated in metadata associated with the modified data. In block 510, a display driver and a display are used to generate a representation of the subject-of-interest responsive to the modified data.

Next, as indicated in decision block 512, a determination is made whether the desired perspective has been achieved. When it is the case that the desired perspective has not been achieved, as indicated by the flow control arrow labeled "NO" exiting block 512, processing continues with block 514, where the perspective-correction factor is adjusted. Thereafter, the activities of blocks 506 through 514 are repeated as may be desired. Otherwise, when it is the case that the desired perspective has been achieved, as indicated by the flow control arrow labeled "YES" exiting block 512, method 500 terminates.

Figure 6:
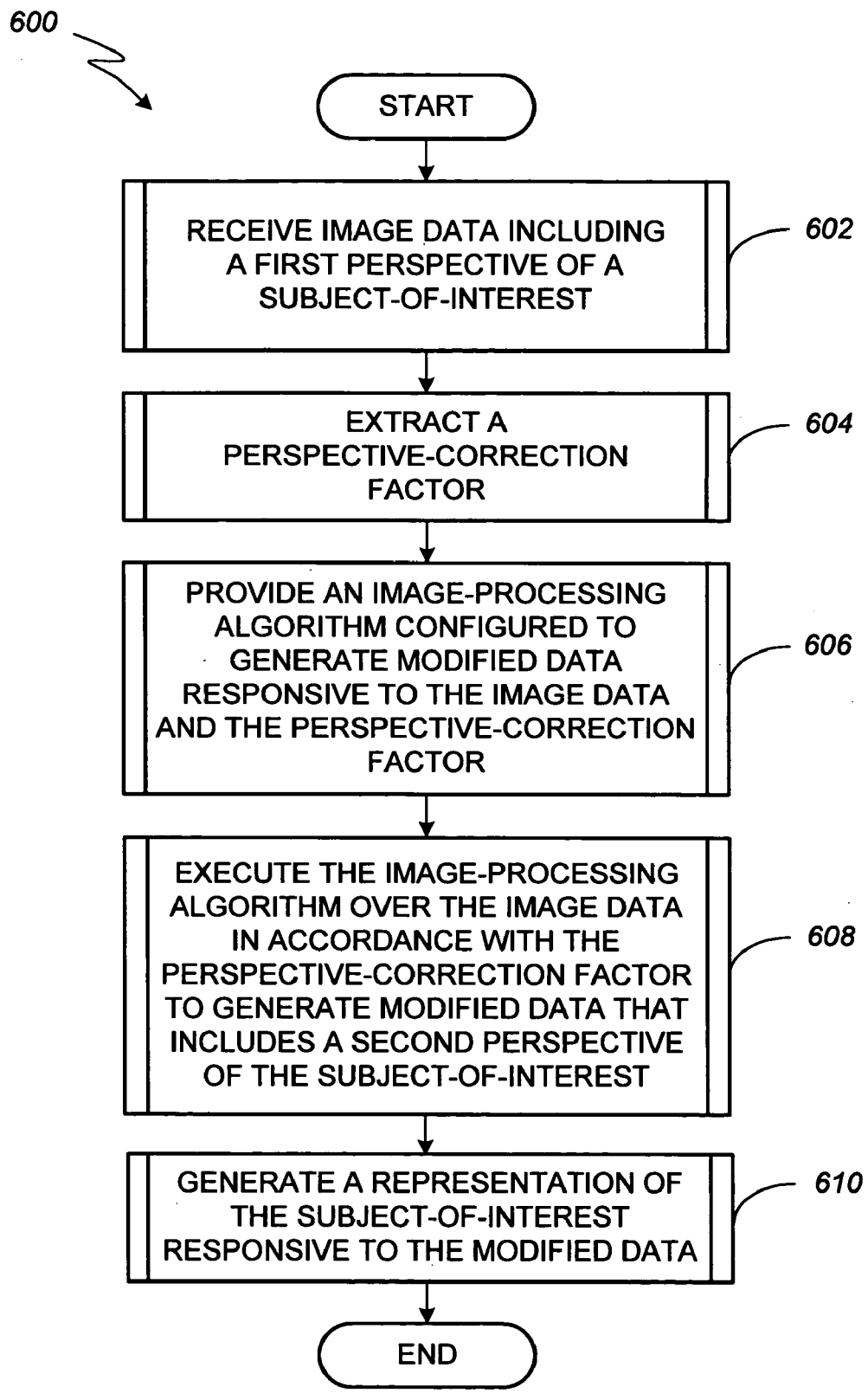
FIG. 6 is a flow diagram illustrating an embodiment of a method for generating a representation of an image.

FIG. 6 is a flow diagram illustrating an embodiment of a method 600 for generating a representation of an image. Method 600 begins with block 602 where an image-processing device receives image data including a first perspective of a subject-of-interest. In block 604, the image-processing device extracts a perspective-correction factor. Next, as indicated in block 606, an image-processing algorithm is provided that is configured to generate modified data responsive to the image data and the perspective-correction factor. Thereafter, as indicated in block 608, the image-processing device executes the image-processing algorithm over the image data in accordance with the perspective correction factor to generate modified data that includes a second perspective of the subject-of-interest. After the modified data has been generated, the modified data is forwarded to a display to generate a representation of the subject-of-interest responsive to the modified data as indicated in block 610.

Figure 7:
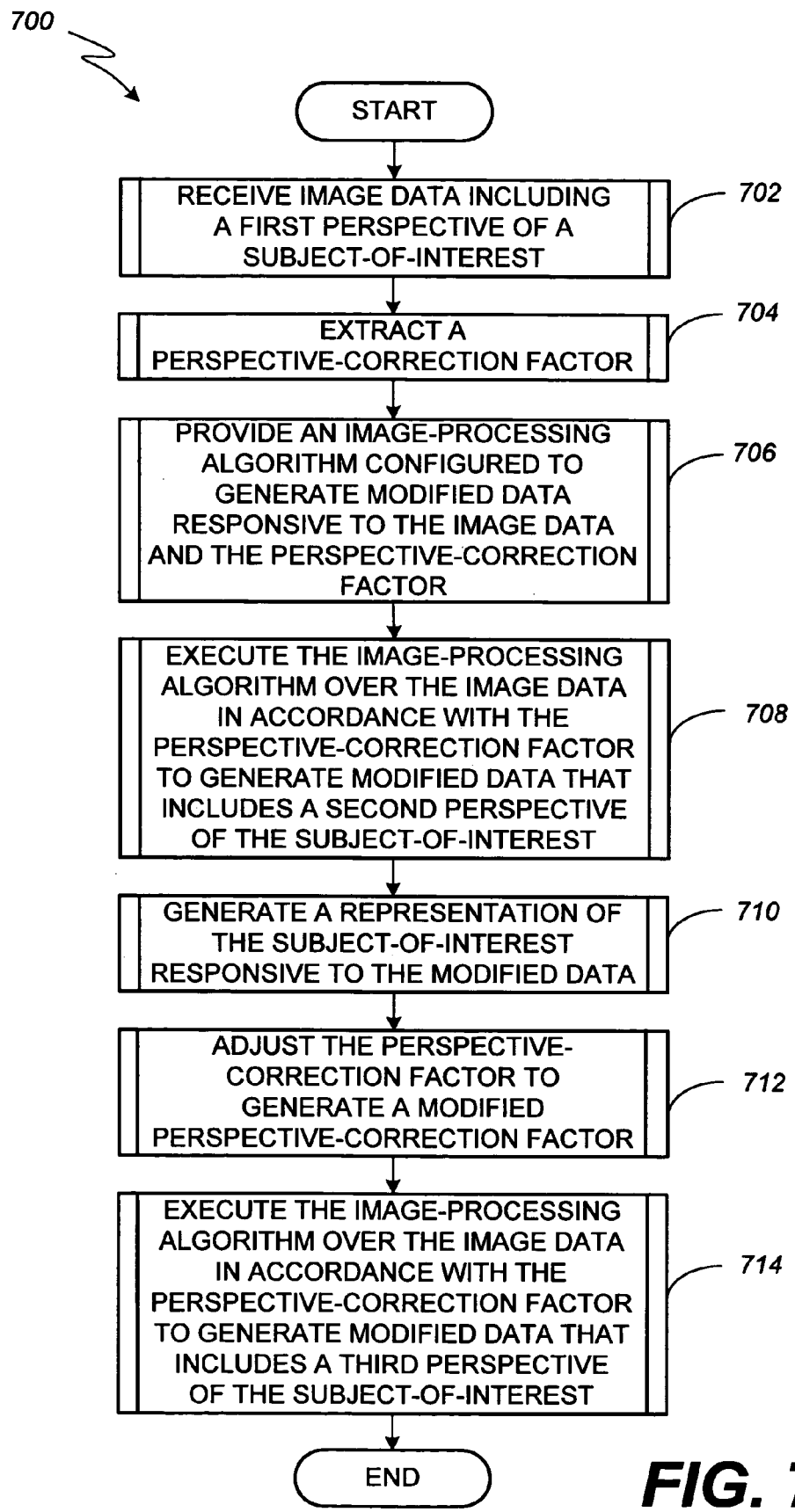
FIG. 7 is a flow diagram illustrating an alternative embodiment of a method for generating a representation of an image.

FIG. 7 is a flow diagram illustrating an alternative embodiment of a method 700 for generating a representation of an image. Method 700 begins with block 702 where an image-processing device receives image data including a first perspective of a subject-of-interest. In block 704, the image-processing device extracts a perspective-correction factor. Next, as indicated in block 706, an image-processing algorithm is provided that is configured to generate modified data responsive to the image data and the perspective-correction factor. Thereafter, as indicated in block 708, the image-processing device executes the image-processing algorithm over the image data in accordance with the perspective correction factor to generate modified data that includes a second perspective of the subject-of-interest. After the modified data has been generated, the modified data is forwarded to a display to generate a representation of the subject-of-interest responsive to the modified data as indicated in block 710.

Next, as indicated in block 712, the perspective-correction factor is adjusted. Thereafter, the image-processing device executes the image-processing algorithm over the image data in accordance with the adjusted perspective-correction factor to generate modified data that includes a third perspective of the subject-of-interest. In some embodiments, the perspective-correction factor applied in block 704 is determined after analysis of the first perspective of the subject-of-interest. The analysis can be accomplished by both manual and automated mechanisms. In these embodiments, the representation generated in block 710 is observed and used to determine a desired adjustment to the perspective-correction factor in block 712. In some embodiments, the adjustment to the perspective-correction factor is a manual adjustment.

It should be understood that additional images, each generated in accordance with a respective perspective-correction factor, can be generated by repeating the activities associated with blocks 710, 712, and 714 until a desired perspective is achieved. Once an operator has indicated that the modified image includes the desired perspective, the modified image can be stored with an indication of the applied perspective-correction factor. In an alternative embodiment, the original image data can be stored along with an indication of the desired perspective-correction factor that should be applied to render an image with the operator's desired perspective of the subject-of-interest.

Figure 8:
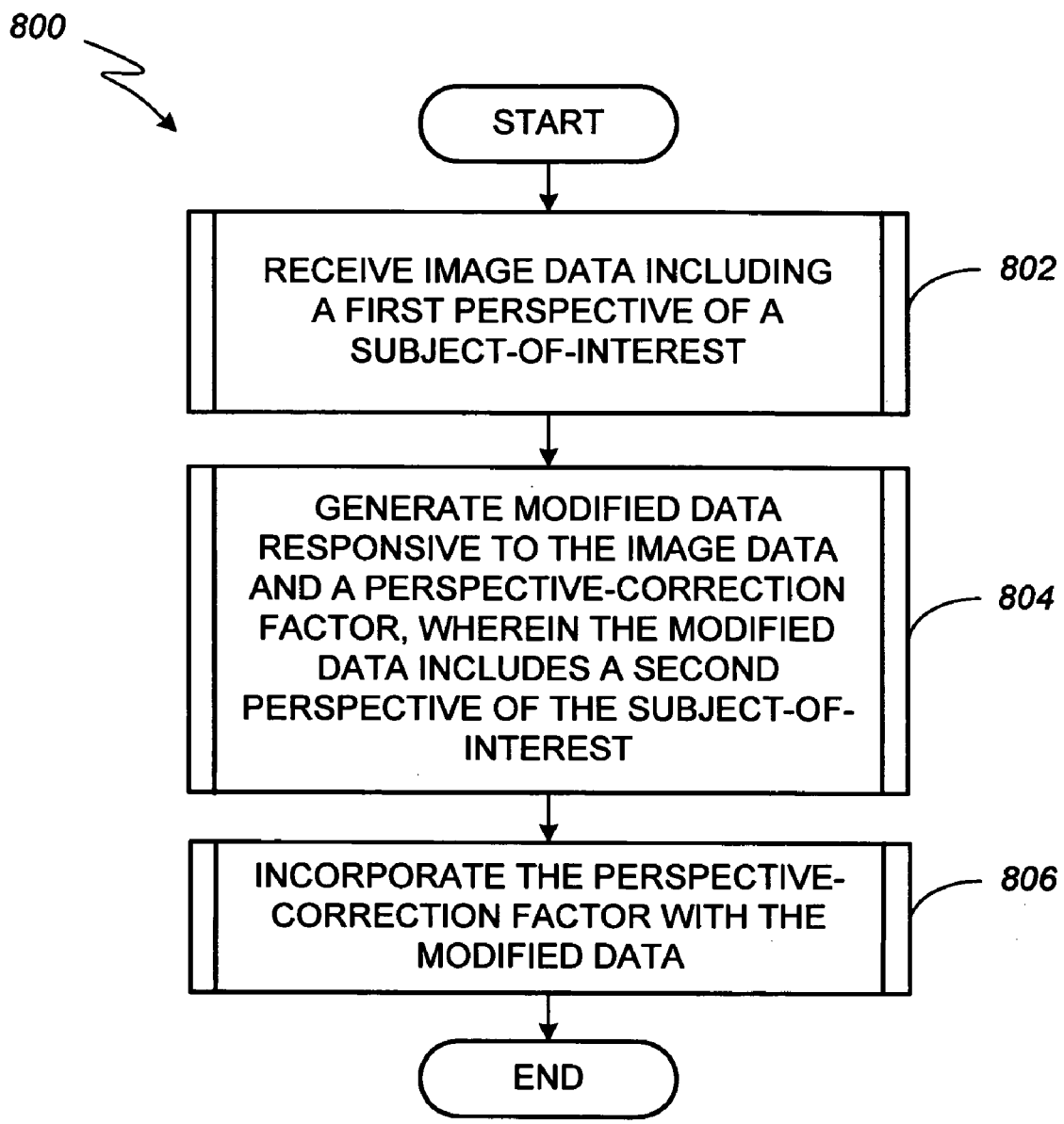
FIG. 8 is a flow diagram illustrating an embodiment of a method for modifying perspective in an image.

FIG. 8 is a flow diagram illustrating an embodiment of a method 800 for modifying perspective in an image. As illustrated in block 802, an image-processing device receives image data that includes a first perspective of a subject-of-interest. Next, in block 804, the image-processing device generates modified data responsive to the image data and a perspective correction factor wherein the modified data includes a second perspective of the subject-of-interest. Thereafter, as indicated in block 806, the image-processing device, incorporates the perspective-correction factor with the modified data.

Figure 9:
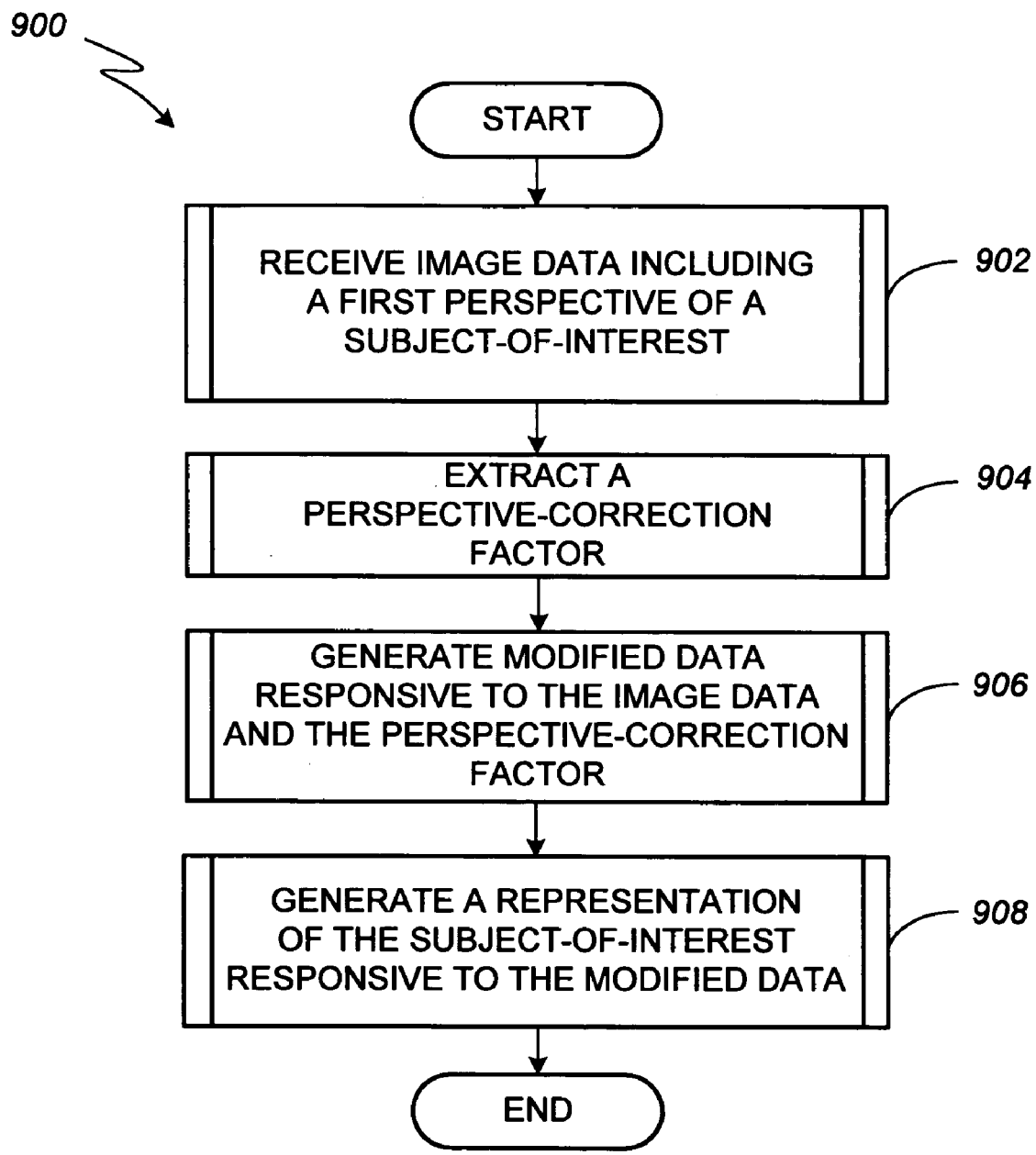
FIG. 9 is a flow diagram illustrating an embodiment of a method for displaying image data.

FIG. 9 is a flow diagram illustrating an embodiment of a method 900 for displaying image data. As illustrated in block 902, an image-processing device receives image data comprising an image having a perspective of a subject-of-interest and a perspective correction factor. Next, in block 904, the image-processing device extracts the perspective-correction factor. Thereafter, as illustrated in block 906, the image-processing device generates modified data responsive to the image data and the perspective-correction factor. Last, as indicated in block 908, the image-processing device generates a representation of the subject-of-interest responsive to the modified data.

It should be emphasized that the above-described embodiments are merely examples of implementations of the systems and methods for correcting perspective in an image. Many variations and modifications may be made to the above-described embodiments. All such modifications and variations are intended to be included herein within the scope of this disclosure and protected by the following claims.

What is claimed is:

1. an apparatus, comprising:
    an image-capture system configured to capture an image representing a subject-of-interest from a first perspective;
    a user interface; and
    an image processor coupled to the image-capture system, said image processor configured to execute an image-processing algorithm on the image to generate modified data responsive to the user interface and an image perspective-correction factor, the modified data configured to facilitate a representation of the subject-of-interest from a second perspective, the image processor further configured to determine whether the second perspective is a desired perspective based on input received through the user interface and, in response to a determination that the second perspective is not the desired perspective, the image processor is further configured to adjust the perspective-correction factor, apply the adjusted perspective-correction factor to the image-processing algorithm, and re-execute the image-processing algorithm on the image.

2. The apparatus of claim 1, further comprising: a display coupled to the image processor, said display configured to receive the modified data and generate a representation of the subject-of-interest.

3. The apparatus of claim 2, wherein the representation of the subject-of-interest has an operator desired perspective.

4. The apparatus of claim 1, wherein the user interface modifies a perspective adjust feature status.

5. The apparatus of claim 1, wherein the image processor is configured to store the image perspective-correction factor in metadata associated with the image data.

6. The apparatus of claim 1, wherein the image processor is configured to store the image perspective-correction factor in metadata associated with the modified data.

7. The apparatus of claim 1, wherein the user interface comprises an adjustment control for modifying the perspective-correction factor.

8. A method for modifying image perspective, the method comprising the steps of:
    capturing an image responsive to light incident upon an image-capture device, wherein the image represents a subject-of-interest from a first perspective;
    providing an image-processing algorithm executable by the image-capture device, the image-processing algorithm configured to generate modified data responsive to the image and a perspective-correction factor;
    executing the image-processing algorithm on the image in accordance with the perspective-correction factor to generate modified data that includes a second perspective of the subject-of-interest;
    determining whether the second perspective is a desired perspective based on input received through the user interface; and
    in response to a determination that the second perspective is not the desired perspective, adjusting the perspective-correction factor, applying the adjusted perspective-correction factor to the image-processing algorithm, and re-executing the image-processing algorithm on the image.

9. The method of claim 8, wherein the image comprises a representation of features of the subject-of-interest that begin to converge.

10. The method of claim 9, wherein the features of the subject-of-interest are substantially parallel.

11. The method of claim 8, further comprising the steps of: generating a representation of the subject-of-interest responsive to the modified data; adjusting the perspective correction factor to generate a modified perspective-correction factor; executing the image-processing algorithm over the image in accordance with the modified perspective-correction factor to generate modified data that includes a third perspective of the subject-of-interest.

12. The method of claim 8, further comprising the step of: incorporating the perspective-correction factor into metadata.

13. The method of claim 12, wherein the step of incorporating the perspective-correction factor into metadata comprises incorporating the metadata into the image.

14. A method for displaying an image, the method comprising the steps of:
    receiving an image responsive to light incident upon an image-capture device, wherein the image represents a subject-of-interest from a first perspective;
    extracting a perspective-correction factor;
    providing an image-processing algorithm configured to generate modified data responsive to the image and the perspective-correction factor;
    executing the image-processing algorithm on the image in accordance with the perspective-correction factor to generate modified data that includes a second perspective of the subject-of-interest;
    determining whether the second perspective is a desired perspective based on input received through the user interface;
    in response to a determination that the second perspective is not the desired perspective, adjusting the perspective-correction factor, applying the adjusted perspective-correction factor to the image-processing algorithm, and re-executing the image-processing algorithm on the image; and
    generating a representation of the subject-of-interest.

15. The method of claim 14, further comprising the steps of: adjusting the perspective-correction factor to generate a modified perspective-correction factor; executing the image-processing algorithm on the image in accordance with the modified perspective-correction factor to generate modified data that includes a third perspective of the subject-of-interest.

16. The method of claim 14, wherein the step of extracting comprises identifying the perspective-correction factor in metadata.

17. The method of claim 16, wherein identifying the perspective-correction factor comprises analyzing a header.

18. The method of claim 16, wherein identifying the perspective-correction factor comprises analyzing the image.

19. A system for correcting perspective errors in an image, comprising:
    means for capturing an image representing a subject-of-interest from a first perspective;
    means for receiving an input;
    image processing means for executing an algorithm on the image to generate modified data responsive to the input and a perspective-correction factor, the modified data corresponding to a second perspective of the subject-of-interest;
    means for determining whether the second perspective is a desired perspective based on input received through the user interface;
    means for, in response to a determination that the second perspective is not the desired perspective, adjusting the perspective-correction factor, applying the adjusted perspective-correction factor to the image-processing algorithm, and re-executing the image-processing algorithm on the image; and means for presenting a representation of the modified data.

20. The system of claim 19, further comprising: means for adjusting the perspective-correction factor.

21. The system of claim 19, further comprising: means for incorporating the perspective-correction factor with the modified data.

22. A computer-readable medium having a program for modifying perspective in an image, the program comprising logic configured to perform the steps of:
receiving an image representing a subject-of-interest from a first perspective;
generating modified data responsive to the image and a perspective-correction factor wherein the modified data includes a second perspective of the subject-of-interest;
incorporating the perspective-correction factor with the modified data;
determining whether the second perspective is a desired perspective based on input received through the user interface; and
in response to a determination that the second perspective is not the desired perspective, adjusting the perspective-correction factor, applying the adjusted perspective-correction factor to the image-processing algorithm, and re-executing the image-processing algorithm on the image.

23. A computer-readable medium having a program for displaying an image, the program comprising logic configured to perform the steps of:
receiving an representing a subject-of-interest from a first perspective, and a perspective-correction factor;
extracting the perspective-correction factor;
generating modified data responsive to the image and the perspective-correction factor, the modified data being representative of a second perspective;
determining whether the second perspective is a desired perspective based on input received through the user interface;
in response to a determination that the second perspective is not the desired perspective, adjusting the perspective-correction factor, applying the adjusted perspective-correction factor to the image-processing algorithm, and re-executing the image-processing algorithm on the image; and
generating a representation of the subject-of-interest.

24. An apparatus, comprising:
an image-capture system configured to capture an image representing a first perspective of a subject-of-interest;
a user interface; and
an image processor coupled to the image-capture system, said image processor configured to determine a perspective-correction factor that when applied in an image processing algorithm on the image generates modified data responsive to the user interface and the perspective-correction factor, the modified data configured to facilitate a representation of the subject-of-interest from a second perspective, the image processor further configured to determine whether the second perspective is a desired perspective based on input received through the user interface and, in response to a determination that the second perspective is not the desired perspective, the image processor is further configured to adjust the perspective-correction factor, apply the adjusted perspective-correction factor to the image-processing algorithm, and re-execute the image-processing algorithm on the image.

25. The apparatus of claim 24, wherein the input control modifies a perspective adjust feature status.

26. The apparatus of claim 25, wherein the image processor is configured to store the perspective-correction factor in the modified data.

27. The apparatus of claim 25, wherein the image processor is configured to store the perspective-correction factor in metadata associated with the modified data.

28. The apparatus of claim 24, further comprising: an adjustment control configured to provide a signal configured to modify the perspective-correction factor.

29. an apparatus, comprising:
an interface configured to receive an image representing a subject-of-interest from a first perspective, and a perspective-correction factor; and
an image processor coupled to the interface, said image processor configured to execute an image-processing algorithm on the image to generate modified data responsive to the image and the perspective-correction factor, the modified data configured to facilitate a representation of the subject-of-interest from a second perspective, the image processor further configured to determine whether the second perspective is a desired perspective based on input received through the user interface and, in response to a determination that the second perspective is not the desired perspective, the image processor is further configured to adjust the perspective-correction factor, apply the adjusted perspective-correction factor to the image-processing algorithm, and re-execute the image-processing algorithm on the image.

30. The apparatus of claim 29, further comprising: a display coupled to the image processor, said display configured to receive the modified data and generate a representation of the subject-of-interest.

31. The apparatus of claim 29, further comprising: an input control configured to adjust the perspective-correction factor.

32. The apparatus of claim 31, wherein the input control modifies a perspective adjust feature status.

33. The apparatus of claim 31, wherein the image processor is configured to store the image perspective-correction factor in metadata associated with the image.

34. The apparatus of claim 31, wherein the image processor is configured to store the image perspective-correction factor in metadata associated with the modified data.

* * * * *

UNITED STATES PATENT AND TRADEMARK OFFICE
CERTIFICATE OF CORRECTION

PATENT NO. : 7,990,412 B2  Page 1 of 1
APPLICATION NO. : 10/978326
DATED : August 2, 2011
INVENTOR(S) : Dana Jacobsen et al.

It is certified that error appears in the above-identified patent and that said Letters Patent is hereby corrected as shown below:

In column 9, line 5, in Claim 1, delete "an" and insert -- An --, therefor.

In column 12, line 23, in Claim 29, delete "an" and insert -- An --, therefor.

Signed and Sealed this
Third Day of April, 2012

David J. Kappos
*Director of the United States Patent and Trademark Office*